United States Patent [19]

McKnight

[11] 4,404,986
[45] Sep. 20, 1983

[54] TAKE UP SYSTEM FOR LONG LENGTHS OF HIGH PRESSURE HOSE

[75] Inventor: James B. McKnight, Louisville, Ga.

[73] Assignee: Fulghum Industries, Inc., Wadley, Ga.

[21] Appl. No.: 224,822

[22] Filed: Jan. 13, 1981

[51] Int. Cl.³ .................. B65H 75/34; B65H 51/20
[52] U.S. Cl. .................. 137/355.17; 137/355.25; 212/251; 242/47.5; 414/918
[58] Field of Search ............... 242/47.5; 137/355.17, 137/355.23, 355.24, 355.25; 414/918

[56] References Cited

U.S. PATENT DOCUMENTS

| | | | |
|---|---|---|---|
| 1,395,616 | 11/1921 | Stroberger | 242/47.5 |
| 1,422,359 | 7/1922 | Hill | 137/355.25 |
| 1,864,891 | 6/1932 | Coberly et al. | 137/355.25 |
| 2,730,332 | 1/1956 | Hale | 242/47.5 |
| 2,896,659 | 7/1959 | Erickson | 137/355.23 |
| 3,214,033 | 10/1965 | Nilsson | 414/918 |
| 3,967,736 | 7/1976 | Tarassoli | 212/251 |

Primary Examiner—A. Michael Chambers
Attorney, Agent, or Firm—Cushman, Darby & Cushman

[57] ABSTRACT

A system for taking up the slack in two flexible resilient hoses of a high pressure system, for alternately supplying fluid under high pressure from a fixed source to, and exhausting it from, a double-acting fluid motor movable relative to the source, includes a line connecting the hoses intermediate their ends and a movable counterweight connected with the line movably along an intermediate length thereof so that alternate stretching and alternate contracting of the hoses, by the alternate supply of pressure fluid to and the alternate exhaust of pressure fluid from the hoses, does not move the counterweight.

4 Claims, 6 Drawing Figures

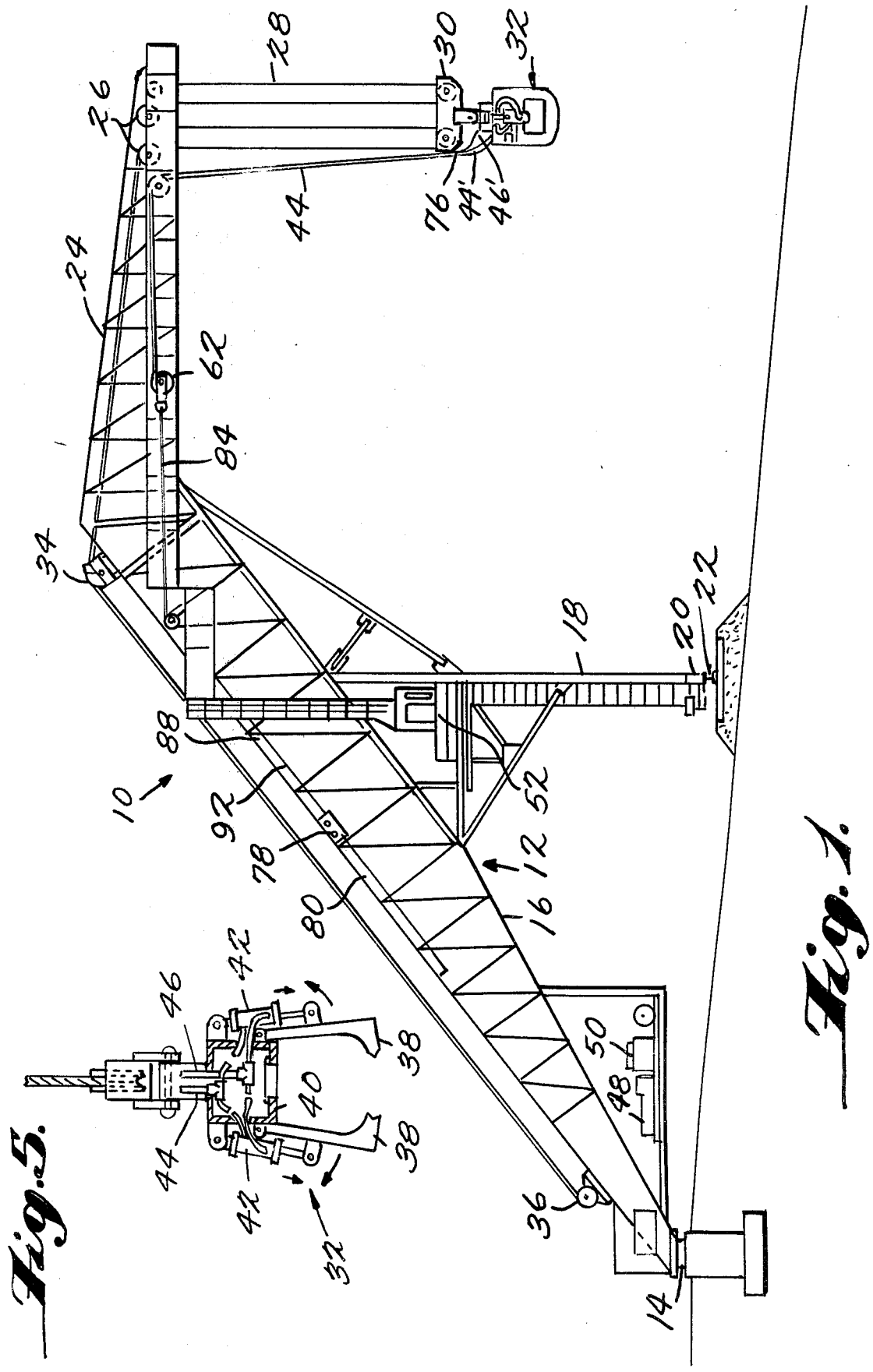

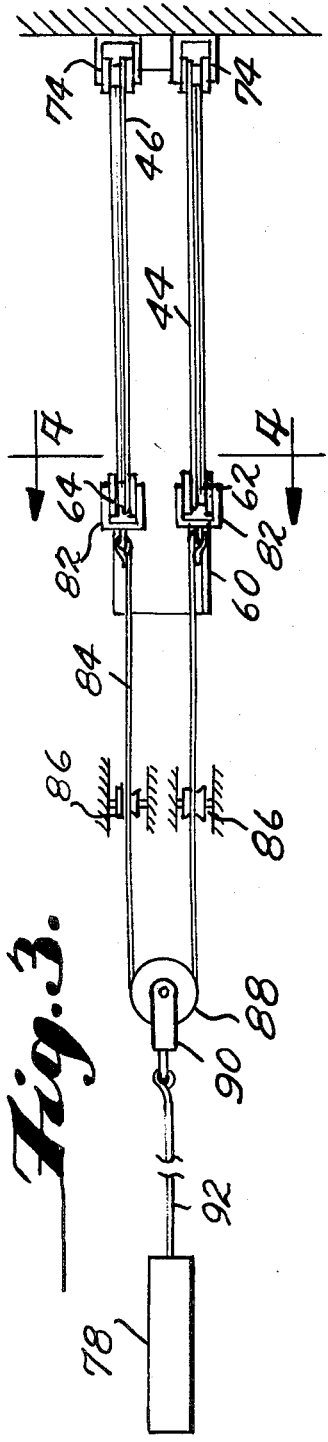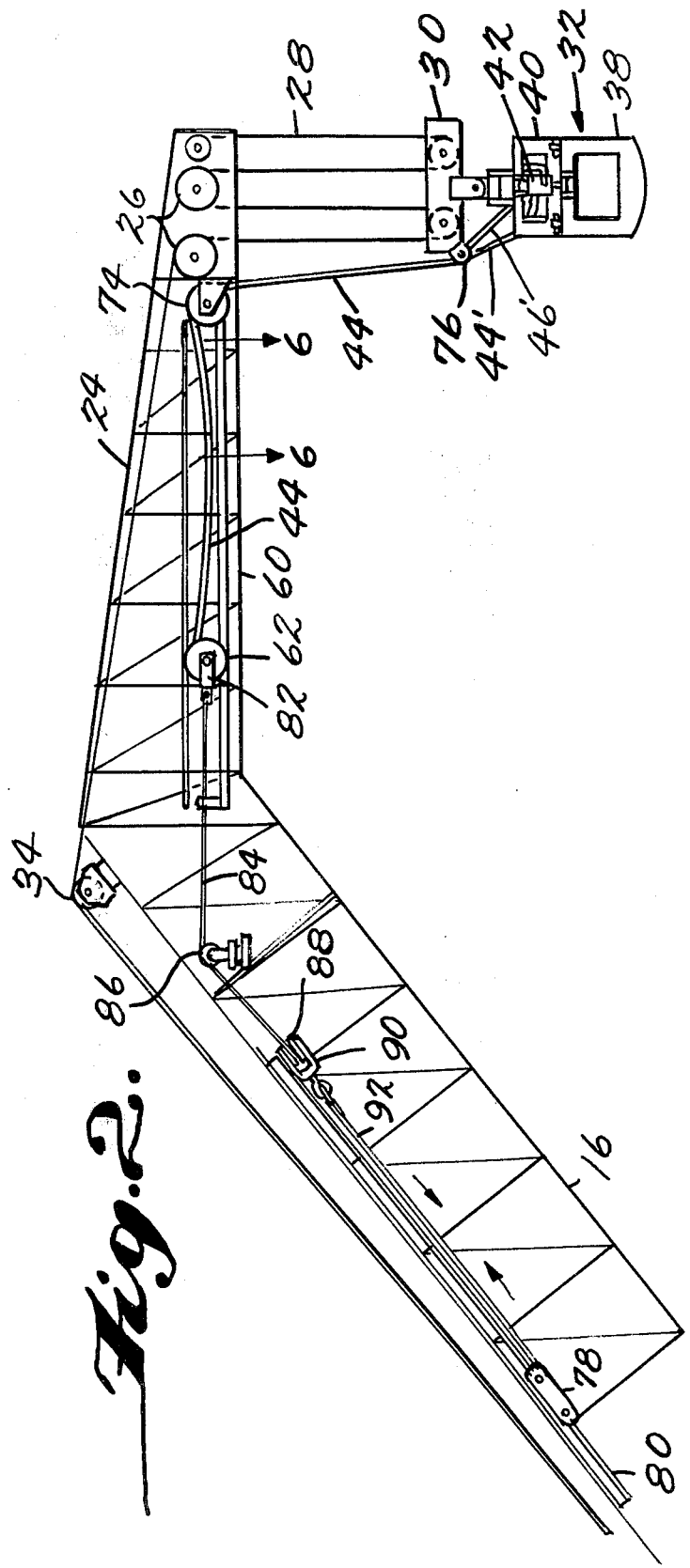

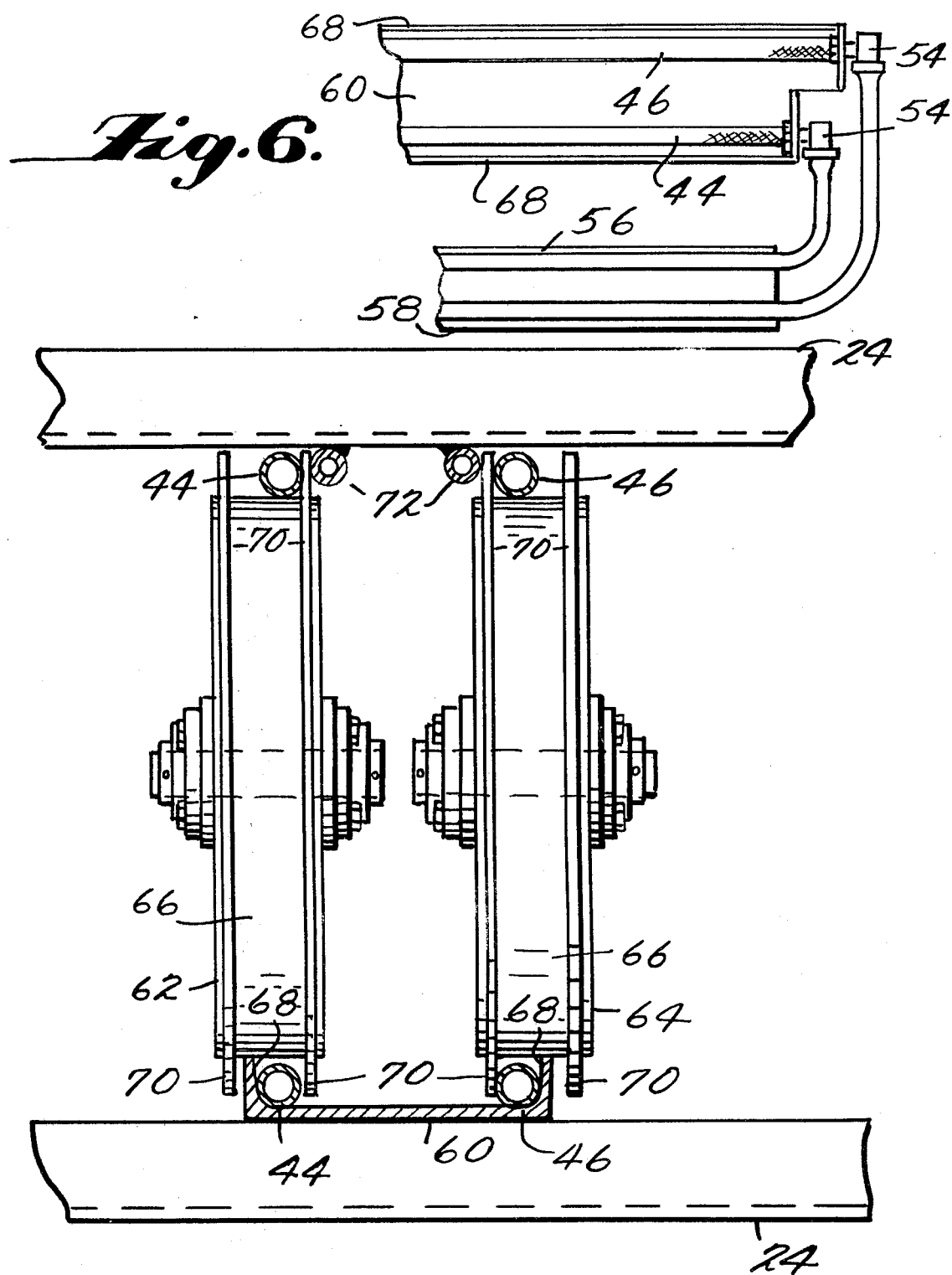

TAKE UP SYSTEM FOR LONG LENGTHS OF HIGH PRESSURE HOSE

FIELD OF THE INVENTION

This invention pertains to take-up systems for high pressure hoses and, more particularly, to take-up systems for two long hoses which alternatively supply high pressure fluid to, and exhaust it from, a double acting fluid motor that is movable relative to the fluid source.

BACKGROUND OF THE INVENTION

Many installations of double acting fluid motors that are movable relative to the source of pressure fluid for powering the motors require the use of long lengths of two hoses for supplying high pressure fluid to, and exhausting it from, the motor. The hose lengths are at least as long as the greatest distance obtainable between the fluid source, e.g., the ends of fixed supply lines, and the motor. An example of such an installation is a log crane having a grapple operable by a double-acting hydraulic motor such as is disclosed in U.S. Pat. No. 3,967,736 to Tarassoli. In such installations, the hose lengths necessary to accommodate movement of the grapple may be quite long, e.g., 85 feet. Such long hose lengths necessitate some form of mechanism or system to take up the slack therein, e.g., when the grapple is raised, to prevent damage to the hoses. The take-up system shown in the aforementioned patent merely involves a line attached at one end to the dangling hoses between their ends and thence extended over a pulley to a suspended counterweight. Such a system, while simple, is unsatisfactory in that the hoses rapidly wear at the point of attachment of the line thereto.

A known more sophisticated take-up system for the hydraulic hoses of a log crane involves a movable dual pulley rotating on a horizontal axis and guided for linear movement along a horizontal track located in the overhanging elevated portion of the boom. The hoses are looped over the pulley with one leg of each loop lying in the track and having its end connected to a fixed supply pipe. The other leg overlies the track-supported leg and thence is extended over a fixed pulley to depend to the grapple. A counterweight is attached to the movable pulley by a line extending over a fixed pulley displaced horizontally from the movable pulley opposite the length of the hose loops. This take-up system, while far more efficient and satisfactory than that disclosed in the aforesaid patent, still gives rise to problems. The operating pressure of the double-acting hydraulic cylinders used to open and close the grapple is of the order of 2,000 psi while the lengths of each high pressure hose is of the order of 85 feet. It was found that when such pressure is supplied to the hoses, which are about 1 inch in diameter, they will stretch or elongate about 2% of their length, i.e., about 20 inches. Thus, in operation, when such pressure is supplied to one hose and exhausted from the other, the one hose elongates suddenly about 20" and the other retracts by about the same amount. The sudden elongation, without movement of the grapple, caused corresponding movement of the counterweight to trail the elongation with the result that the counterweight, of the order of two tons, impacted the hose with the movable pulley and stretched it still more. On continued use, it was found that the hoses stretched 22" to 90" and continued to stretch even more until they ruptured.

The following U.S. Pat. Nos. all disclose various types of take-up systems for hoses for supplying fluid under pressure to double-acting fluid motors, but none address the problem encountered by alternate elongation and contraction of the hoses on the supply and exhaust of high fluid pressure therethrough:

Brude et al. 3,474,985 Oct. 28, 1969
Guinot et al. 3,516,433 June 23, 1970
Bellings 3,776,403 Dec. 4, 1973
Dunbar 3,893,480 July 8, 1975
Ehrhardt 3,968,859 July 13, 1976
Pugh et al. 4,034,875 July 12, 1977

BRIEF SUMMARY OF THE INVENTION

Accordingly, it is an object of this invention to provide an improved take-up system for long lengths of high pressure hoses, for alternately supplying high pressure fluid to, and exhausting it from, double-acting fluid motors that are movable relative to the fluid source, which results in less stretching, wear, damage and frequency of rupture of such hoses.

The object is accomplished by connecting the hoses, intermediate their lengths, with a balancing line trained over a movable pulley that is biased by a counterweight to hold taut the line and hoses.

Other objects and advantages of the invention will become evident from the following description and accompanying drawings, in which:

BRIEF DESCRIPTION OF THE DRAWINGS

FIG. 1 is a side view of a log crane having a hose take-up system embodying this invention.

FIG. 2 is an enlarged fragmentary view of a portion of FIG. 1.

FIG. 3 is a schematic top view of the take-up system shown in FIG. 2.

FIG. 4 is an enlarged fragmentary view taken substantially on line 4—4 of FIG. 3.

FIG. 5 is an enlarged fragmentary view of the left hand side of the grapple shown in FIG. 2.

FIG. 6 is an enlarged fragmentary sectional view taken substantially on line 6—6 of FIG. 2.

DETAILED DESCRIPTION OF THE INVENTION

Referring now to the drawing, there is shown a log crane 10 similar to that shown in the aforementioned Tarassoli patent. The crane 10 has a boom 12 supported at its lower end for rotation about a fixed vertical pivot bearing assembly 14. The boom 12 includes an inclined truss section 16 supported intermediate its ends by a vertical leg 18 provided with driven wheels 20 rolling on a circular track 22 coaxial with the fixed bearing assembly 14. At its upper end, the inclined truss section 16 carries a cantilevered overhanging truss section 24. Fastened to the outer end of the overhanging truss section 24 and reeved over sheaves 26 thereon is a hoisting cable 28 suspending a bicycle block 30 which carries a log grapple 32. From the sheaves 26, the cable 28 is trained over a guide sheave 34 on the upper end of the inclined truss section 16 and thence downward to the winding drum 36 of a hoist carried on the inclined truss section.

The grapple 32 has two claw-like arms or jaws 38 pivoted on a box-like body 40 and each movable by a double-acting hydraulic cylinder 42 to open and close the grapple. Two flexible hoses 44, 46 are connected to the opposite ends of the two cylinders 42 to alternately supply hydraulic fluid under pressure to one end of the cylinders while exhausting it from the other end to move the jaws 38 in one direction, e.g., to open the grapple 32, and to supply hydraulic fluid under pressure to the other ends of the cylinders while exhausting it from the one ends to move the jaws in the other direction, e.g., to close the grapple. Hydraulic fluid is supplied to the hoses 44, 46 by a hydraulic power package, which includes a high pressure pump 48 and a tank 50, carried by and beneath the inclined truss section 16. The hoist 36, rotation of the crane 10 about the bearing assembly 14, and the supply and exhaust of high pressure fluid to and from the grapple cylinders 42 are under the control of an operator in a cab 52 located at the upper end of the leg 18.

Such cranes are quite large. For example, the horizontal distance between the fixed pivot bearing 14 and a point beneath the grapple 32 may be of the order of 120 feet, with the tip of the crane being of the order of 64 feet high, i.e., above ground. As mentioned before, the length of the hydraulic hoses necessary to accommodate up-and-down movement of the grapple in a crane of such size is of the order of 85 feet.

One end of each hose 44, 46 is connected by an appropriate fixed fitting 54 to the end of a line 56, 58 which extends from the hydraulic package and terminates fixedly adjacent the tip of the boom 12. The lines 56, 58 may be metal pipes or hoses the same as the hoses 44, 46. From the fittings 54, the hoses 44, 46 are laid in and along a horizontal guide channel 60 supported in the overhanging truss section 24. Toward the rear end of the channel 60, the hoses 44, 46 are trained up and around two independent movable pulleys 62, 64. Each pulley 62, 64 has a drum 66 riding on one of the upstanding flanges 68 of the channel 60 and side flanges 70, one of which rides outside a corresponding flange 68 of the channel 60 and the other of which rides in the channel with the corresponding hose 44, 46 disposed between the flanges 68 and 70, as shown in FIG. 4. Guide rods 72 for the pulleys 62, 64 may be supported in the truss section 24 above and between the pulleys. From the pulleys 62, 64, the hoses 44, 46 are trained over fixed pulleys 74 mounted at the forward end of the channel 60, and thence downwardly to the bicycle block 30 to which they are fixed, as at 76, with slack extensions to the double-acting cylinders 42 of the grapple 32.

From the foregoing it will be seen that the movable pulleys 62, 64 will travel linearly forwardly along the channel 60, to the right as seen in FIG. 2, as the grapple 32 descends. To take up the slack in the hoses 62, 64 as the grapple 32 ascends, the pulleys 62, 64 are fastened to a counterweight 78 which depends from and rolls along an inclined rail 80 mounted within and along the inclined truss section 16. For this purpose, the two movable pulleys 62, 64 are connected by yokes 82 and a line 84 which extends rearwardly of the channel 60 over two fixed guide pulleys 86 and thence downwardly and is trained over a third movable pulley 88 that, in turn, is connected, by a yoke 90 and a line 92, to the counterweight 78.

From the foregoing, it will be seen that as the grapple 32 descends and ascends, the movable pulleys 62, 64 will travel linearly back and forth along the guide channel 60 to accommodate corresponding movements of the hoses 44, 46 without the formation of any slack therein. Further, when high pressure is admitted to one hose and exhausted from the other, the one will stretch and the other contract, with consequent opposite movements of the movable pulleys 44, 46. Such opposite movements, though substantially the same distance, will cause no movement of the counterweight 78 because the line 84 will simply move around the pulley 88 to accommodate such opposite movements. Hence, the application of high pressure to each hose 44, 46, with its consequent stretching, will not result in lagging sudden takeup movement by a counterweight that will damage a hose.

It thus will be seen that the objects and advantages of this invention have been fully and effectively achieved. It will be realized, however, that the foregoing specific embodiment has been disclosed only for the purpose of illustrating the principles of this invention and is susceptible of modification without departing from such principles. Accordingly, the invention includes all embodiments encompassed within the spirit and scope of the following claims.

I claim

1. In a high pressure system having two flexible resilient hoses for alternately supplying fluid under high pressure from a fixed source thereof to, and alternately exhausting the fluid from, a double acting fluid motor movable relative to the source, the combination of a take-up system for maintaining said hoses slack-free comprising:
    fixed means connecting one end of each of said hoses to the source with the hoses extending from said means to the motor with a length equal to at least the maximum distance between said fixed means and the motor;
    flexible line means extending between and connecting said hoses intermediate their ends;
    a movable counterweight; and
    means connecting said counterweight with said line means, said connecting means being movable along an intermediate length of said line means, whereby alternate stretching and alternate contracting of said hoses, occasioned by the alternative supply of high pressure fluid thereto and alternative exhaust of the fluid therefrom may take place without substantial movement of said counterweight.
2. The structure defined in claim 1 wherein each extended hose length has a loop therein and including first and second movable pulley means, one engaging the bight of each of said loops with the line means being connected to and between said first and second pulley means.
3. The structure defined in claim 2 wherein the line means has a loop therein and including a third pulley means movable relative to each other engaged with said line means loop with the counterweight being connected to said third pulley means.
4. The structure defined in claim 2 wherein the legs of the hose loops are generally parallel and including guideways for confining the first and second pulley means to substantially linear movement generally parallel to said legs.

* * * * *